US005188700A

United States Patent [19]

Gilkes

[11] Patent Number: 5,188,700

[45] Date of Patent: Feb. 23, 1993

[54] APPARATUS FOR LAYING LINES IN AN ICE RINK

[76] Inventor: Robert R. Gilkes, 39 Jonathan Crescent, Winnipeg, Manitoba, Canada, R2R 1Z3

[21] Appl. No.: 654,526

[22] Filed: Feb. 13, 1991

[51] Int. Cl.[5] .......... B44C 7/00; B32B 31/00

[52] U.S. Cl. .......... 156/575; 156/574; 156/577; 156/579

[58] Field of Search .......... 156/574, 575, 577, 579, 156/80; 52/80; 33/27.01, 27.04

[56] References Cited

U.S. PATENT DOCUMENTS

| | | | |
|---|---|---|---|
| 3,960,643 | 6/1976 | Dargitz et al. | 156/575 X |
| 4,022,651 | 5/1977 | Larkins et al. | 156/577 |
| 4,242,173 | 12/1980 | Stenemann | 156/577 X |
| 4,552,611 | 11/1985 | Dery et al. | 156/574 X |
| 4,725,328 | 2/1988 | Arnold | 156/577 X |

*Primary Examiner*—David A. Simmons

*Assistant Examiner*—J. Sells

*Attorney, Agent, or Firm*—Adrian D. Battison; Stanley G. Ade; Murray E. Thrift

[57] ABSTRACT

Apparatus for laying lines in an ice rink comprises a frame for carrying a reel of paper to be dispensed onto the ice surface so that the reel runs on an axle carried upon the frame. A spray nozzle is mounted so as to spray water onto the paper after it is laid to form a first layer of ice over the paper. One embodiment provides an arrangement for laying curved lines for forming a full circle and includes a guide pole having a fulcrum pin at one end and a handle attached to the guide pole at the outer radial end for pushing the pole and thus unwinding the paper across the ice around the circle defined by the pole. An embodiment for laying straight lines includes a base frame guidable by a slot which runs across a string laid in the ice. The base frame can receive a full width reel or can be divided into separate portions to receive narrower width reels.

9 Claims, 5 Drawing Sheets

APPARATUS FOR LAYING LINES IN AN ICE RINK

BACKGROUND OF THE INVENTION

This invention relates to an apparatus for laying lines in an ice rink. Lines of the type generally used in hockey or similar games require a circular line to be laid on the ice surface at a particular location on the rink and also straight lines generally across the ice.

Many techniques have been available for forming the markings on an ice rink. In previous years paint has been applied in the ice, allowed to freeze and covered by further ice. More recently the lines in the ice have been formed by the application of paper or other material strips which are laid onto the ice, covered by a thin layer of further ice and flooded with thicker ice. The laying of the paper strips in straight lines for example the blue lines or red lines of a hockey rink requires the strip material to be stretched across the ice surface and while it is stretched a thin layer of water sprayed over the strip to hold it in place. This is not difficult but often requires two people and difficulties can arise in windy conditions. Also patterned lines as checkerboard or three stripe styles are often required and these can become more problematic.

The circles have been found to be very difficult to form and this takes a very long time and requires laborious action by two persons initially describe the circle on the ice and then to lay the strip by hand a short length at a time while attempting to bend it around the curvature of the circle while a second person sprays water onto the laid strip before it has a chance to move. This is an entirely hand operated procedure and extremely cumbersome and time consuming and leads therefore to a significant cost in the initial layup of the markings on the rink.

SUMMARY OF THE INVENTION

It is one object of the present invention, therefore, to provide an improved apparatus for laying the lines on an ice rink.

According to the invention, therefore, there is provided an apparatus for laying coloring materials on an ice surface comprising a support member having an axle for supporting a reel of a wound layer of a coloured strip material and means supporting the axle such that the reel can roll on the surface of the ice to allow unwinding of the layer, a handle member for applying manual force to the support member to propel the support member in a required path of travel across the ice surface, and liquid spray jet means mounted for movement with the support member across the ice surface for spraying liquid onto the layer as it is unrolled.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
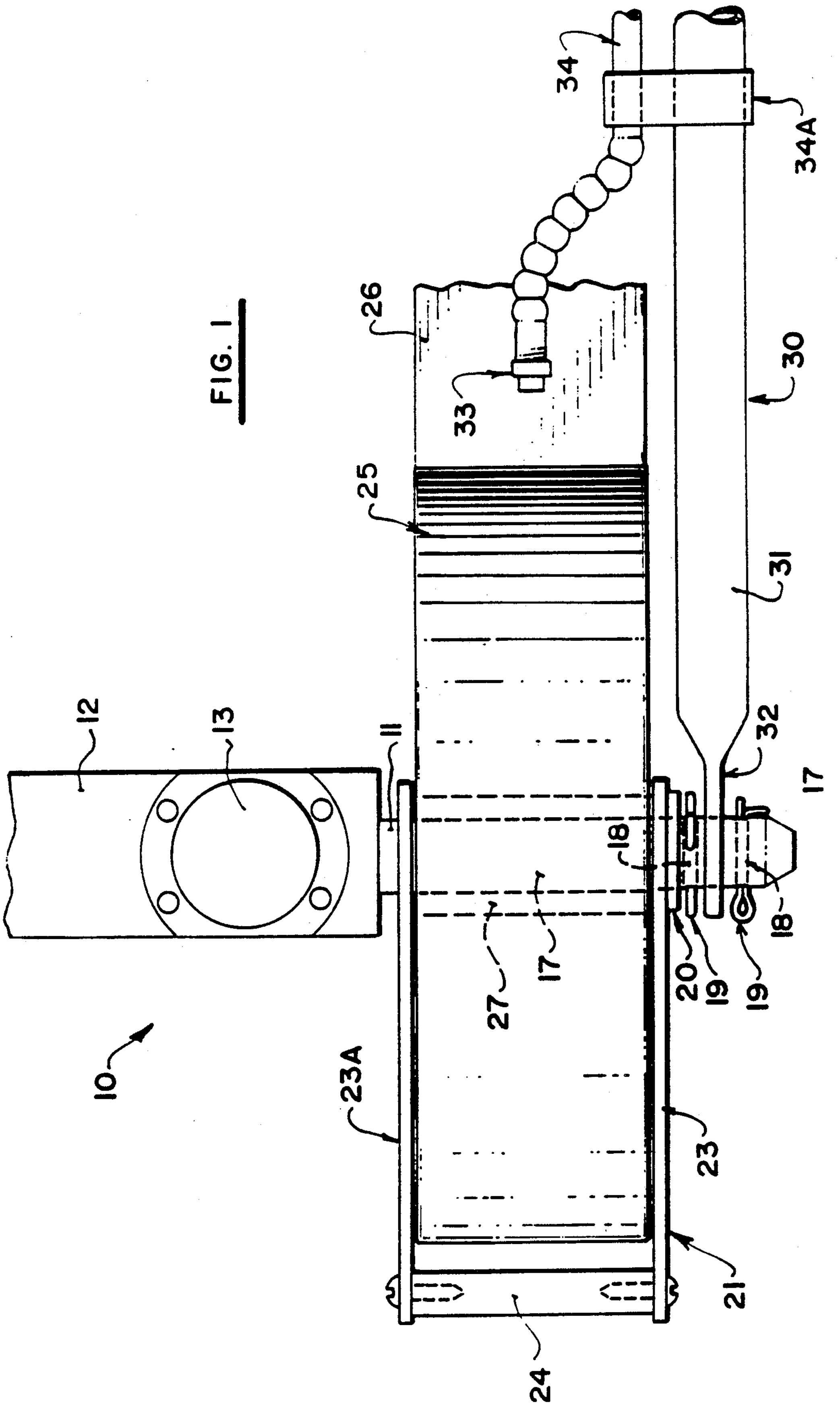
FIG. 1 is a top plan view of one part of an apparatus according to the present invention for laying curved lines.
Figure 2:
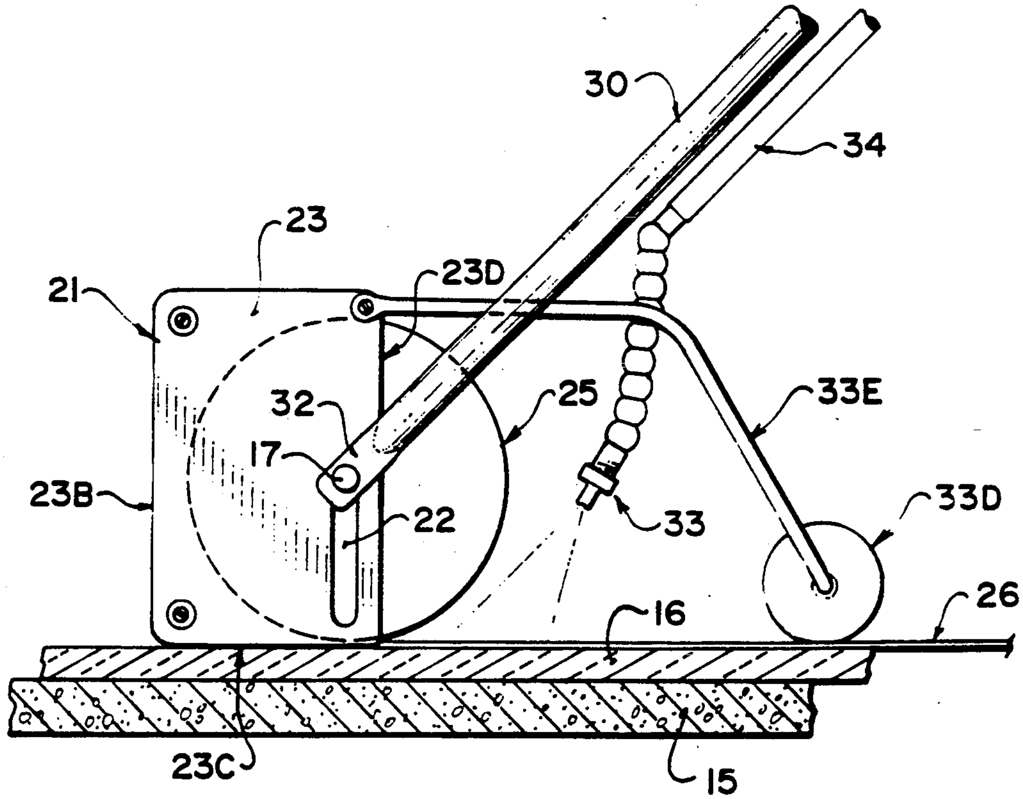
FIG. 2 is a side elevational view of the apparatus of FIG. 1 also showing an optional roller.
Figure 3:
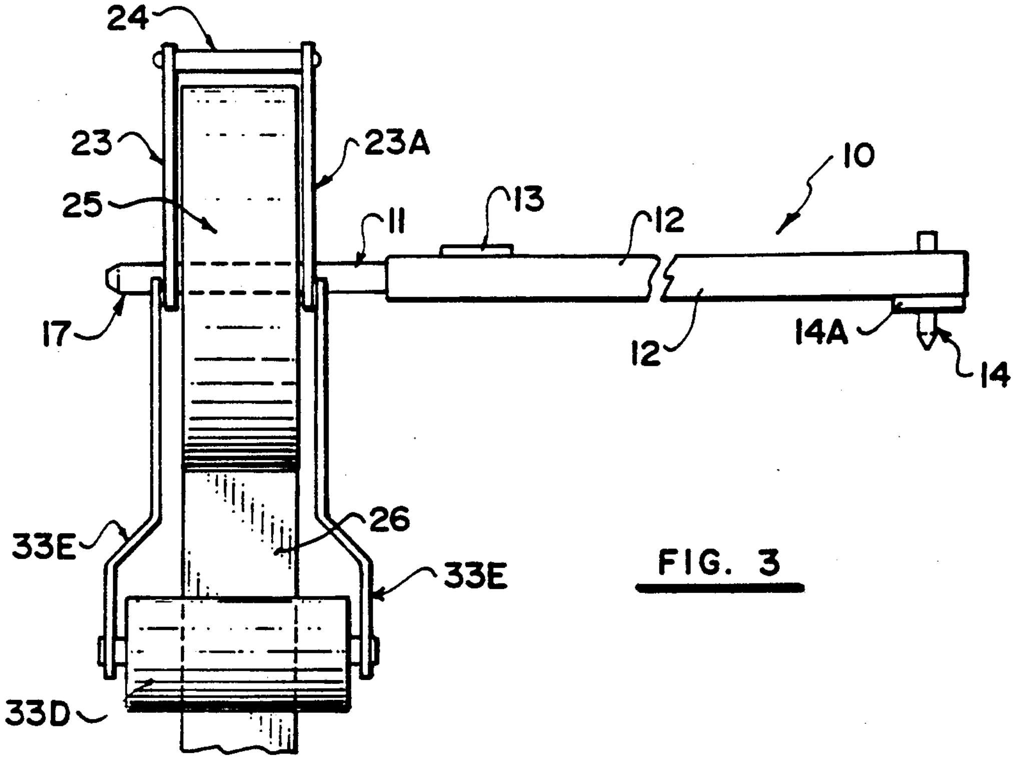
FIG. 3 is a partly in plan and partly in elevation view of the apparatus of FIG. 2.

The apparatus of FIGS. 1, 2 and 3 comprises an elongate guide pole 10 which is manufactured in two coaxial portions 11 and 12 so that the length of the guide pole can be adjusted by manual actuation of a clamp 13.

At one end of the guide pole is provided a fulcrum pin 14 for engaging into the ice surface and particularly a drilled hole in the ice surface. A polyethylene pad 14A is positioned around the pin to limit penetration of the pin into the ice and to provide a bearing surface to rest on top of the ice. The depth of the pin relative to the pad can be adjusted for different thickness of ice. In FIG. 2 a concrete base for the ice rink is indicated at 15 and a first layer of ice is indicated at 16 on top of the concrete layer. In general the first layer is of the order of one half inch thick following which a further layer of ice is applied to complete a required thickness of about one inch which is used as the upper surface of the ice in a hockey arena.

At the end of the guide pole remote from the fulcrum pin 14 is provided a support pin 17 attached into an end face of the guide pole so as to lie axially along the length of the guide pole. The pin 17 includes at its end a pair of transverse openings 18 each for receiving a cotter pin 19 to act as a locking arrangement to prevent axial movement along the pin 17. Inside of the first cotter pin 19 is provided a washer 20 which acts as a bearing surface. Inside the washer 20 is a guard member 21 which has an opening 22 through which the pin 17 projects. The guard member 21 includes two end plates 23, 23A lying at right angles to the axis of the guide pole and a side plate 24. The end plates 23, 23A are generally rectangular in shape having a front vertical edge 23B and a horizontal bottom edge 23C free to slide across the ice surface. A rear vertical edge 23D is positioned part way across the reel described hereinafter. The opening 22 is formed as a slot adjacent to and parallel to the rear edge so as to extend vertically and to allow the pin 17 passing through the slot to rise and fall vertically in dependance upon the amount of material on the reel.

Between the end plates 23, 23A and the end of the guide pole on the pin 17 is mounted a reel 25 of a strip material 26. The strip material is wound into a spiral form upon a core 27 thus forming a spirally wound package or reel of the strip which can be unwound across the ice surface. The core 27 is formed as a sliding fit on the pin 17 so that it can rotate on the pin but is prevented from twisting movement. The end face of the reel which is opposite to the fulcrum pin 14 rests against the inside surface of the end plate 23 and is guided thereby in rotation about the pin 17 as the material layer is unwound.

A handle member is generally indicated at 30 and includes an elongate pole 31 with a loop 32 at the lower end which can be engaged over the end of the pin 17 and locked in place by the second pin 19. On the underside of the pole 31 is provided a spray duct 34 and nozzle 33. The spray duct is attached to the pole 31 with suitable straps 34A so that it is held in location with the spray nozzle 33 projecting downwardly onto the ice at a position just behind the reel.

In operation the fulcrum pin 14 and spacer is applied to a centre point of a circle to be formed on the ice. A portion of the paper strip 26 is then unwound from the reel and attached to the ice surface by spray from a suitable spray gun which may be the nozzle 33 or separate spray unit.

The guard member 21 is then moved to a position in which the side plate 24 lies in front of the roll. The spray nozzle 33 is then activated by pressure of a suitable switch to spray water onto the paper as it rests upon the ice surface. The handle 30 is then pushed by the user so that the guide pole 10 is caused to move around the fulcrum pin 14 thus unrolling the paper strip as the reel is moved forwardly. The spray 33 is then applied onto the paper strip to quickly freeze the paper strip to the ice surface. Adjusting the spray slightly backwards prevents water from the spray getting onto the reel which could cause freezing of the reel thus preventing the proper unwinding of the paper strip from the reel. The side plate 24 as shown is rectangular and lies at right angles to the end plate 23. Other shapes are possible but it is desirable that the guard member can rotate around the pin 17 so that the edge 23C can rest upon the ice regardless of the size of the reel to allow the reel to be substantially fully unwound.

When used with indoor ice, and in the warmer conditions there is a reduced likelihood of the freezing of the reel and it may be advantageous to point the spray nozzle 33 more forwardly to partly wet the paper by a mist before it is applied to the ice to improve the adhesion effect. The guard member may also act as a rest or stand for the device if pivoted to a position in which the side plate rests on the ice surface. The location of the pin 17 and the size of the end plate 23, 23A are selected so that the whole of the reel can be dispensed onto the ice before the device reaches the ice surface. The apparatus allows a circle to be applied very quickly by a single person.

The rectangular side plates 23 and 23A guide the roll as it rotates and particularly in the most important area between the 9 o'clock and 6 o'clock position on the roll as shown in FIG. 2. This ensures that the layer is laid very accurately without side to side movement.

The application of the spray as soon as possible after the laying of the paper layer ensures that it is bonded immediately after laying. This prevents creasing and causes laying of the straight paper strip (preferably crepe or tissue paper) in a curve by tensioning the outer and inner edges without any creases. Whenever possible without freezing up the roll so that it cannot unroll, the paper is prewet by the mist of spray indirectly from the nozzle. The nozzle is of a type using a plasticly flexible pipe (commercially available) so that it can be simply manually adjusted to a set position.

An optional roller 33D on arms 33E can be mounted on the sides 23 and 23A to run over the paper behind the spray to roll out any bubbles which can form due to the tensioning of the layer.

Figure 4:
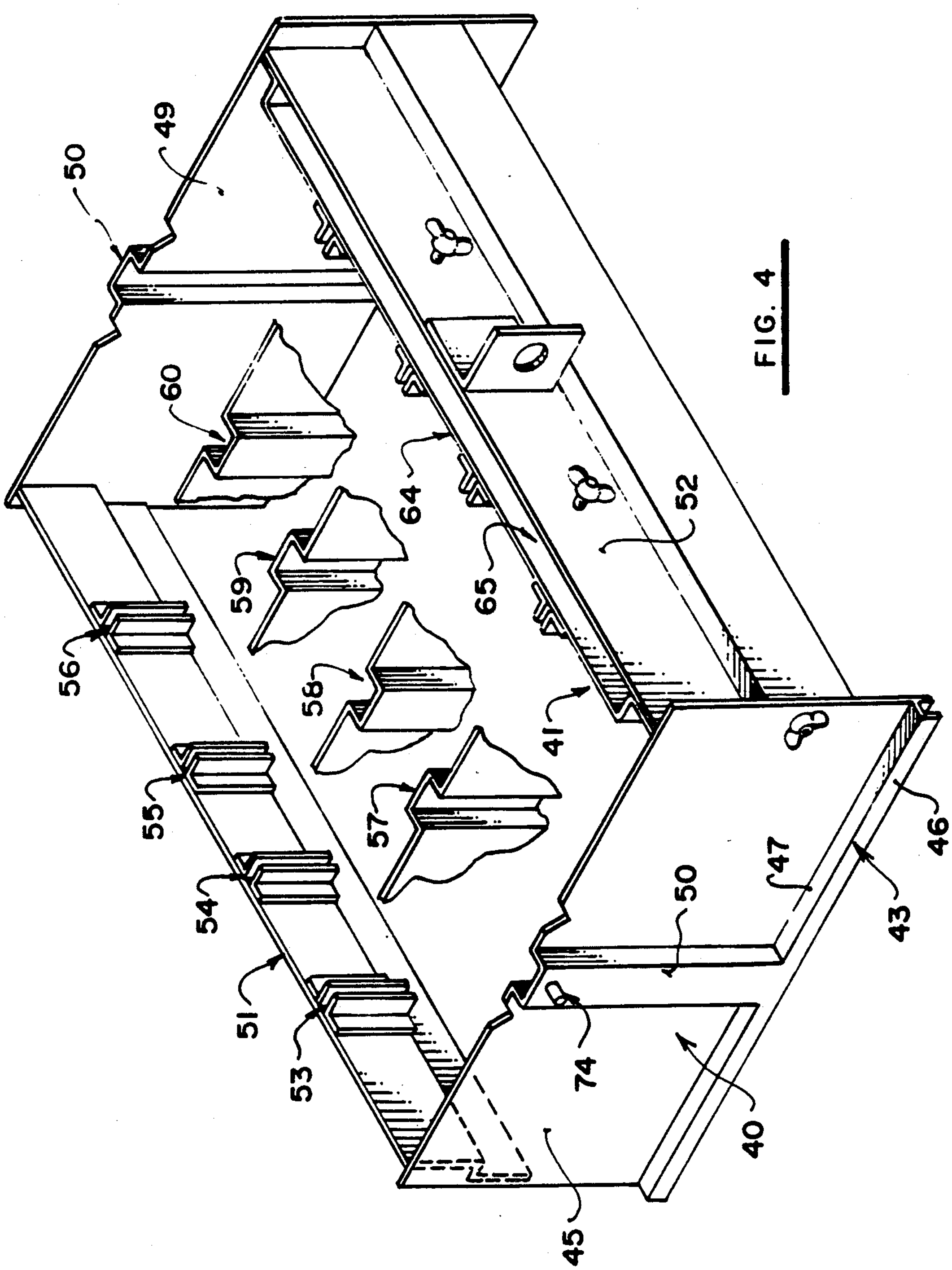
FIG. 4 is an isometric view partly broken away of a base part of an apparatus for laying straight lines on an ice rink.
Figure 5:
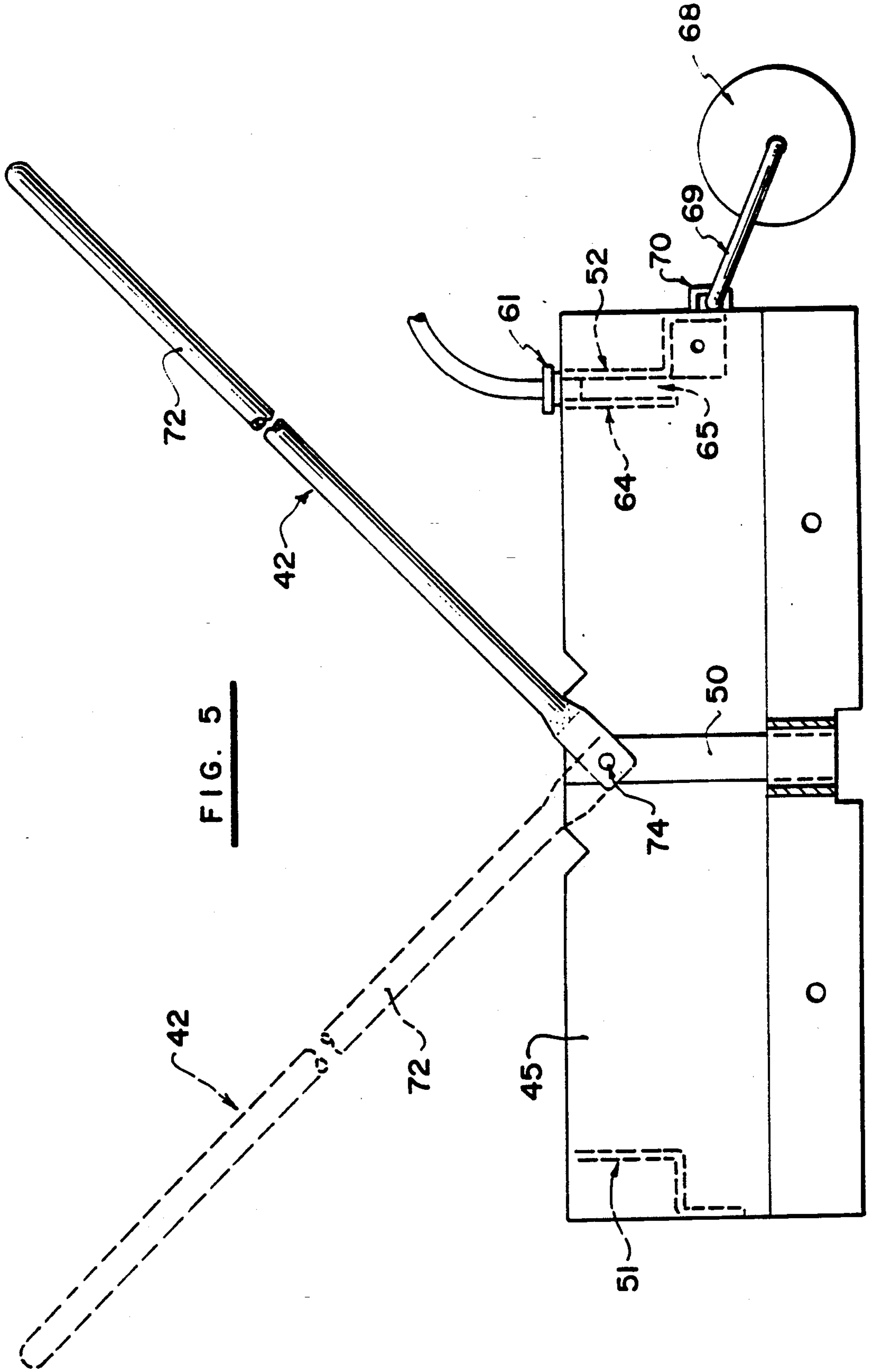
FIG. 5 is a side elevational view of the apparatus of FIG. 4.
Figure 6:
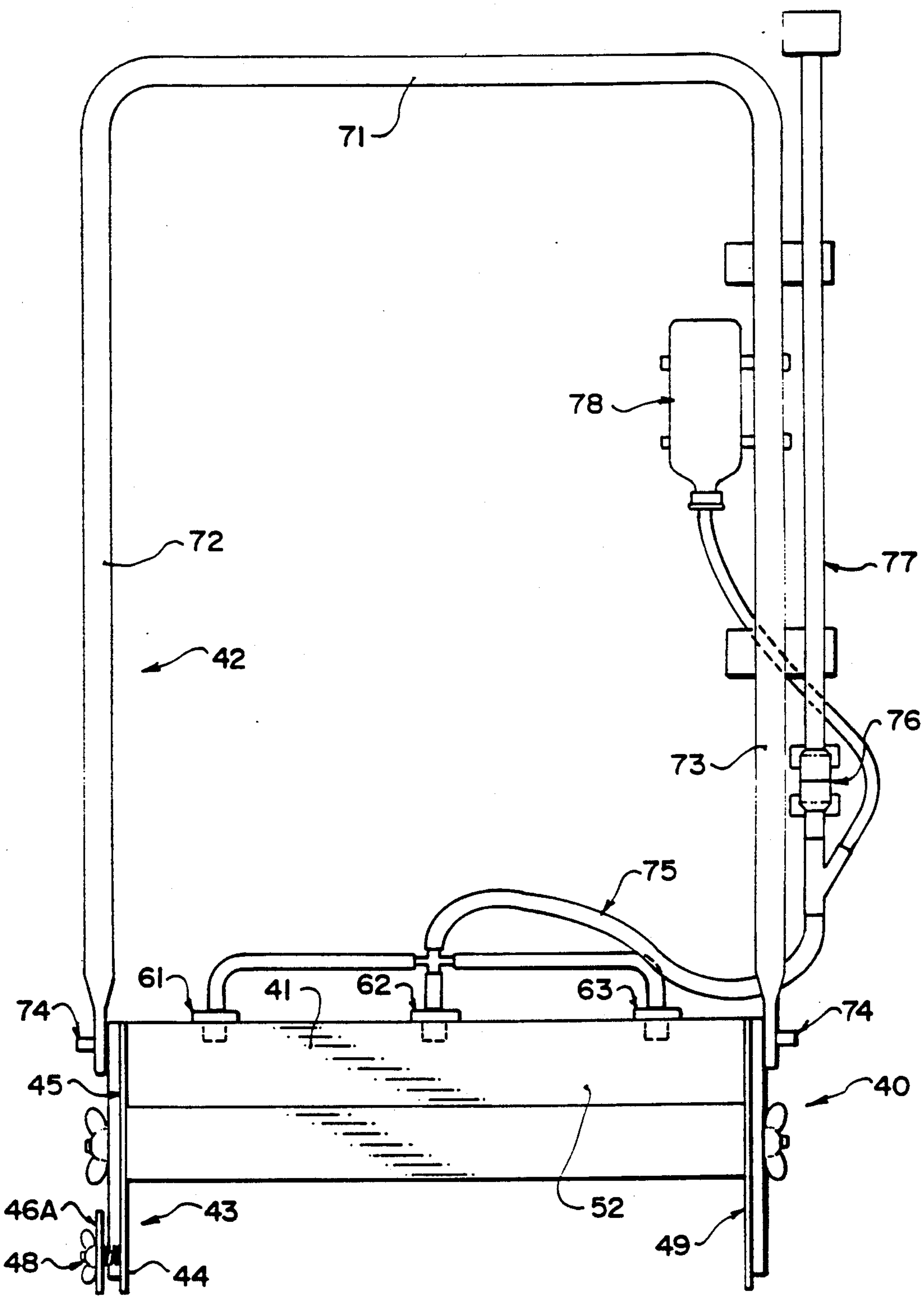
FIG. 6 is an end elevational view of the apparatus of FIGS. 4 and 5.

Turning now to the apparatus shown in FIGS. 4, 5 and 6 the device shown is for use in laying straight lines across the ice. Basically the device comprises a base frame 40 which carries one or more rolls of the paper to be dispensed as previously described, a bracket 41 for supporting spray nozzles, a handle 42 by which the base frame can be pushed and a guide element 43 for guiding the frame across the ice.

The guide element 43 is mounted on one side of the base frame and is defined simply by a pair of parallel plates 44 and 45 which in use straddle an elongate mark element running in the direction intended for movement of the base frame in the laying action. In practical terms, the guide element will be constituted by a length of string which is simply laid onto the ice in a stretched condition at the required location and then frozen onto the ice surface by the application of additional water if necessary. This string then provides a straight ridge or guide element which acts to control the movement of the base frame as it slides across the ice under a motive force from the pushing handle.

In FIG. 4 the guide element 43 is simply shown as a pair of parallel plates one of which is defined by the bottom edge of a side plate 45 of the base frame and the second indicated at 46 is attached as a flange at the lowermost edge of the plate 45. This arrangement simply therefore forms a fixed space between the two plates 45 and 46 defined by the width of a web 47 supporting the flange 46. The string is thus received within the channel thus formed.

In FIG. 6 is shown a slightly modified arrangement in which the plate 46A is attached to the side plate 45 of the frame by a bolt and spring arrangement 48 which allows adjustment of the spacing of the plate 46A from the side plate 45 and allows some flexibility of the plate 46A to accommodate differences in thickness of the string caused by the possible buildup of ice.

The base frame 40 comprises the side plate 45 and a similar opposite side plate 49. Each of the side plates includes a vertical channel 50 along a centre line of the side plate so that the channels 50 are aligned and extend from the top of the side plate to a position closely adjacent the bottom of the side plate. These channels face inwardly and can thus receive an axle in the form of a rod which extends across the full width and carries on it the reel or roll of paper to be dispensed.

In practical terms the width of a main line of a hockey rink is often twelve inches so that the full width between the side plates is equal to this distance so that it can directly receive a twelve inch wide roll of the paper within the frame.

The side plates are supported by front and rear plates 51 and 52 respectively which lie at right angles to the side plates and extend from the top edge of each of the side plates to a position partway down the side plate. Each of the front and rear plates carries four pairs of flanges generally indicated at 53, 54, 55 and 56 with the pairs aligned and defining between them a narrow slot for receiving an additional plate 57, 58, 59 and 60 respectively to act as dividers parallel to the side plates and spaced across the width of the front and rear plates.

Thus where it is required to lay a narrower line than the full twelve inch width, this can be carried out by simply inserting a divider plate for example the plate 57 which also carries a channel 50 corresponding to the channel 50 of the side plate 45. A shorter axle can thus be received between the side plate 45 and the divider plate 57 to receive and carry a narrower role of the paper to be dispensed. If required, each of the divider plates 57, 58, 59 and 60 can be inserted into place to form three spaced receptacles for the paper rolls defined respectively between the side plate 45 and the divider plate 57, between the divider plate 58 and the divider plate 59 and between the divider plate 60 and the side plate 49. These three separate receptacles can each receive a separate roll of paper so as to form a line across the ice defined by three parallel line portions making in total a width of twelve inches but each formed a strip of the order of two inches in width. Lines of this type have been become more popular in recent years to provide a more attractive effect on the ice but are of course very difficult to lay in normal circumstances and using normally available equipment.

The rear plate 52 carries three spray nozzles 61, 62 and 63 which can spray water downwardly onto the ice immediately rearwardly of the laying of the sheet of paper onto the ice as the frame is moved forward across the ice. For this purpose the rear plate 52 is modified by the addition of a sub plate 64 which is parallel to the main body of the rear plate and positioned forwardly thereof so as to define therebetween a slot 65 into which the spray nozzles are mounted to project the spray pattern downwardly onto the ice surface rearwardly of the paper strips.

In an alternative arrangement (not shown) the three spray nozzles can be replaced by a single nozzle positioned rearwardly of the plate 52 on a central support which allows a pivotal action of the spray nozzle about an axis transverse to the direction of movement to the frame to move the spray pattern forwardly or rearwardly of the roll as required. A spray nozzle having a full twelve inch width spraying from a position of the order of four to five inches above the ice surface is available and provides an effective spraying action. In FIG. 5 is shown an additional element not visible in FIGS. 4 and 6 which comprises a roller 68 carried upon a bracket 69 so as to roll across the ice rearwardly of the frame as the frame is moved forwardly. The bracket 69 comprises simply a wire arrangement carried upon a receptacle 70 on the rear surface of the plate 52 which may include spring biasing means (not shown) to bias the roller into engagement with the ground so as to press onto the paper after it is wetted by the spray action to squeeze out any air bubbles which may remain.

The frame is propelled by the handle 42 which can be of any suitable construction for attachment to the base frame and grasping by the hand of a user while conveniently standing adjacent the base frame. As shown the handle 42 is U-shaped and formed from a tubular frame defining a cross bar 71 and two legs 72 and 73 extending from the cross bar for connection to side pivot pins 74 connected at a mid point of the side frames 45 and 49. This allows the handle to pivot as shown in FIG. 5 to two inclined positions forwardly and rearwardly of the base frame to allow the device to be started closely adjacent one side of the rink and moved fully into contact with the opposed side of the rink.

The handle 42 carries connection to a hose 75 connecting to the spray nozzle or nozzles mounted on the base frame. The hose 75 is connected to a quick release coupling 76 which allows a wand 77 to be connected and released as required. The wand 77 is of a type generally attached to a backpack for spraying water, the backpack including a supply and a pump for dispensing the water through the wand 77. The wand 77 can be the same wand as used in the apparatus of FIG. 1 so that the user can quickly detach from the curve laying system to the straight line laying system while carrying the same backpack and supply of spraying water.

To prevent freezing of the nozzle a subsidiary supply 78 of an antifreeze material can be provided for dispensing the antifreeze into the hose 75 and to the nozzle or nozzles when no longer in use.

As mentioned above the construction of the handle can be modified so that it comprises simply a single handle connected centrally of the frame and preferably at the rear plate. The handle can thus lead directly to a single nozzle positioned at the rear plate. The specific construction of the base frame again can be modified depending upon manufacturing requirements with the main features being the provision of the support for the full width axle for a full width paper roll and also support for smaller width axles for the narrower lines required on the rink or for the custom type lines defined by parallel line portion.

In an alternative arrangement (not shown) the frame can be arranged to have a width of the order of forty eight inches in width, to support an axle of equal length to receive a roll of white tissue paper. The frame has a handle and spray system as previously described, but is guided simply by the operator pushing the frame. This can be used to lay a full layer of white paper over the whole rink to provide the required background white color.

The above described devices thus allows the laying of the rink coloring materials by a single operator while moving at normal walking speed, so that the whole rink layout can be completed by a single person in much shorter time and at the same time allowing improved quality of lines so formed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for laying colouring materials on an ice surface comprising a support member having an axle for supporting a reel of a wound layer of a coloured strip material and means supporting the axle such that the reel can roll on the surface of the ice to allow unwinding of the layer, said support member including at least one side guide plate extending from the axle downwardly to a position in contact with the ice surface and forwardly to a position forward of the reel such that said plate engages an outside layer of the material at the side of the reel as it rolls toward contact with the ice surface and means mounting the axle relative to the plate for vertical movement relative to the plate to accommodate different diameter of material remaining on the reel a handle member for applying manual force to the support member to propel the support member in a forward direction in the required path, and water spray jet nozzle means mounted rearwardly of the reel for movement with the support member across the ice surface for spraying liquid water onto the layer as it is unrolled, said spray jet nozzle means being mounted closely adjacent the reel rearwardly of the reel and oriented to spray in a spray direction forwardly and downwardly onto the layer immediately after the layer is placed upon the ice surface, an area between the layer on the ice surface, the spray jet nozzle means and the reel being uninterrupted to allow water spray impacting upon the layer on the ice to engage also the outside layer of the material on the reel, and guide means for cooperating with the ice surface for guiding the support member in a required path of travel across the ice surface.

2. Apparatus according to claim 1 wherein the guide means comprises a guide pole having means defining a fulcrum at one end of the guide pole by which said one end can be located at the centre of a circle for laying of a line surrounding the centre.

3. Apparatus according to claim 2 wherein the fulcrum means comprises a spacer and pin at right angles to the guide pole for engaging into the ice surface.

4. Apparatus according to claim 2 including means for adjustment of the length of the pole from the fulcrum to the reel support member.

5. Apparatus according to claim 1 wherein the guide means comprises means defining a slot for running along a guide string frozen onto the ice surface.

6. Apparatus according to claim 5 wherein the support member includes two side walls each for extending along a respective side of the reel and wherein the means defining a slot is located at one side wall.

7. Apparatus according to claim 1 wherein the support member includes means arranged to receive and guide different widths of the layer.

8. Apparatus according to claim 7 wherein the support member comprises a substantially rectangular frame having divider means therein which can be inserted into the frame so as to extend parallel to sidewalls of the frame thus dividing the frame into a plurality of separate portions each for receiving a separate one of a plurality of said layers.

9. Apparatus according to claim 8 wherein each of the sidewalls and dividers includes a vertical slot therein for receiving an axle pin for vertical sliding movement.

* * * * *